(12) United States Patent
Kim et al.

(10) Patent No.: US 7,432,217 B1
(45) Date of Patent: Oct. 7, 2008

(54) METHOD OF ACHIEVING UNIFORM LENGTH OF CARBON NANOTUBES (CNTS) AND METHOD OF MANUFACTURING FIELD EMISSION DEVICE (FED) USING SUCH CNTS

(75) Inventors: Ha-Jin Kim, Suwon-si (KR); In-Taek Han, Seoul (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 99 days.

(21) Appl. No.: 11/473,070

(22) Filed: Jun. 23, 2006

(30) Foreign Application Priority Data

Oct. 12, 2005 (KR) ............... 10-2005-0096198

(51) Int. Cl.
*H01H 21/31* (2006.01)

(52) U.S. Cl. ............... 438/775; 438/513; 438/680; 257/E21.17; 257/E21.245; 257/E21.311; 257/E39; 257/E51.038; 257/E51.04

(58) Field of Classification Search ............... 438/775, 438/30, 513, 680, 706, 776, 777
See application file for complete search history.

(56) References Cited

U.S. PATENT DOCUMENTS

| 6,437,503 | B1* | 8/2002 | Konuma | 313/495 |
| 6,774,548 | B2* | 8/2004 | Fran et al. | 313/309 |
| 6,819,041 | B2* | 11/2004 | Kajiwara | 313/496 |
| 2004/0169458 | A1* | 9/2004 | Fran et al. | 313/495 |
| 2005/0151195 | A1* | 7/2005 | Kawase et al. | 257/347 |
| 2005/0186699 | A1* | 8/2005 | Kawase et al. | 438/99 |
| 2006/0290003 | A1* | 12/2006 | Kawabata et al. | 257/774 |

* cited by examiner

*Primary Examiner*—David Nhu
(74) *Attorney, Agent, or Firm*—Robert E. Bushnell, Esq.

(57) ABSTRACT

In a method of achieving uniform lengths of Carbon Nano-Tubes (CNTs) and a method of manufacturing a Field Emission Device (FED) using such CNTs, an organic film is coated to cover CNTs formed on a predetermined material layer. The organic film is etched to a predetermined depth to remove projected portions of the CNTs. After that, the organic film is removed.

11 Claims, 4 Drawing Sheets

METHOD OF ACHIEVING UNIFORM LENGTH OF CARBON NANOTUBES (CNTS) AND METHOD OF MANUFACTURING FIELD EMISSION DEVICE (FED) USING SUCH CNTS

CLAIM OF PRIORITY

This application makes reference to, incorporates the same herein, and claims all benefits accruing under 35 U.S.C. §119 from an application for METHOD FOR UNIFORMALIZING LENGTH OF CARBON NANOTUBES AND MANUFACTURING METHOD OF FIELD EMISSION DEVICE USING THE SAME earlier filed in the Korean Intellectual Property Office on the 12 Oct. 2005 and there duly assigned Serial No. 10-2005-0096198.

BACKGROUND OF THE INVENTION

1. Field of the Invention

The present invention relates to a method of achieving uniform lengths of Carbon NanoTubes (CNTs) and a method of manufacturing a Field Emission Device (FED) using such CNTs.

2. Description of the Related Art

Since unique structural and electrical characteristics of Carbon NanoTubes (CNTs) were known, CNTs have been used for a variety of devices such as Field Emission Devices (FEDs), backlights for Liquid Crystal Displays (LCDs), nanoelectronic devices, actuators and batteries.

The FEDs emit light by emitting electrons from an emitter formed on a cathode and by allowing the electrons to collide with a phosphor layer coated on an anode. Recently, CNTs having excellent electron emitting characteristics have been used for the emitters of FEDs. Since FEDs using the CNTs for their emitters have advantages of a wide viewing angle, high resolution, low power consumption, and temperature stability, FEDs can be used for a variety of devices such as a car navigation devices and viewfinders of electronic video devices. More particularly, FEDs can be used for Personal Computers (PCs), Personal Digital Assistants (PDAs), medical apparatus, and High Definition Televisions (HDTVs).

When the lengths of CNTs used for the emitters of FEDs are not uniform, uniform brightness between respective pixels is deteriorated and the life of the FEDs is reduced. Therefore, to improve the uniformity in the brightness of the FEDs, it is necessary to achieve CNTs having uniform lengths.

SUMMARY OF THE INVENTION

The present invention provides a method of achieving uniform lengths of Carbon NanoTubes (CNTs) using an organic film and a method of manufacturing a Field Emission Device (FED) using such CNTs.

The present invention provides a method of achieving uniform lengths of Carbon NanoTubes (CNTs), the method including: forming CNTs on a predetermined material layer; coating an organic film to cover the CNTs formed on the predetermined material layer; etching the organic film to a predetermined depth to remove projected portions of the CNTs; and removing the organic film.

The organic film preferably includes a photoresist. The organic film is preferably etched by dry etching. The dry etching preferably includes oxygen plasma etching.

The present invention also provides a method of manufacturing a Field Emission Device (FED), the method including: sequentially forming a cathode, an insulation layer, and a gate electrode on a substrate, and forming an emitter aperture exposing the cathode in the insulation layer; forming Carbon NanoTubes (CNTs) on the cathode in the inside of the emitter aperture; coating an organic film to cover the CNTs; etching the organic film to a predetermined depth to remove projected portions of the CNTs; and removing the organic film.

The CNTs are preferably formed on the cathode using either a Chemical Vapor Deposition (CVD) or a printing method. The organic film preferably includes a photoresist. The organic film is preferably etched by dry etching. The dry etching preferably includes oxygen plasma etching.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1:
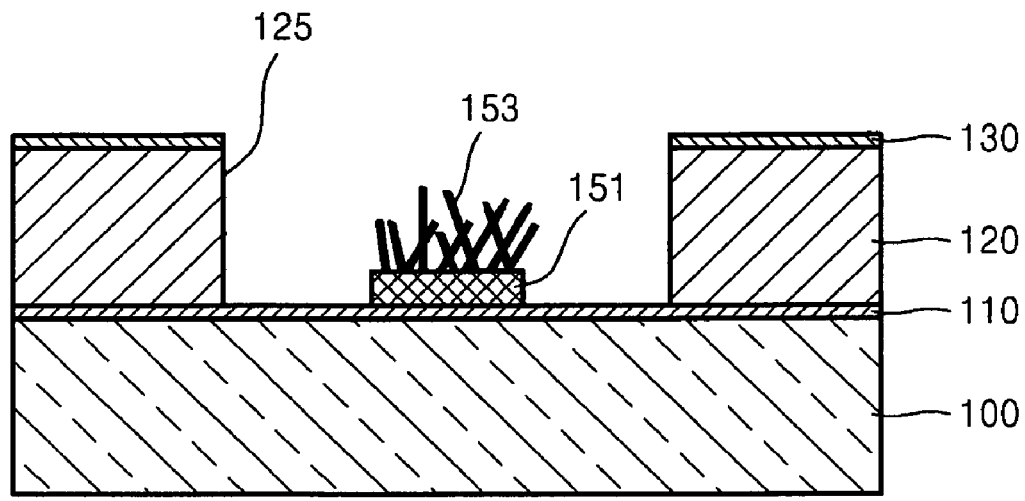
FIGS. 1 through 4 are views of a method of manufacturing an Field Emission Device (FED) according to an embodiment of the present invention.

The present invention is described more fully below with reference to the accompanying drawings, in which exemplary embodiments of the invention are shown. Like reference numerals in the drawings denote like elements, and thus their description have been omitted.

FIGS. 1 through 4 are views of a method of manufacturing an Field Emission Device (FED) according to an embodiment of the present invention and FIGS. 5 through 8 are photographs of a method of manufacturing an FED according to an embodiment of the present invention.

Referring to FIG. 1, after a cathode 110, an insulation layer 120, and a gate electrode 130 are sequentially formed on a substrate 100, an emitter aperture 125 exposing the cathode 110 is formed in the insulation layer 120. The substrate 100 can be a glass substrate. The cathode 110 can be formed of a transparent conductive material, e.g., Indium Tin Oxide (ITO), and the gate electrode 130 can be formed of a conductive material, e.g., Cr.

In more detail, the cathode 110 is formed by depositing a cathode layer on the substrate 100 and then patterning the cathode layer in a predetermined shape, e.g. a stripe shape. Next, the insulation layer 120 of a predetermined thickness is formed on the entire surface of the cathode 110 and the substrate 100. Subsequently, the gate electrode 130 is formed by depositing a gate electrode layer on the insulation layer 120 and then patterning the gate electrode layer. Also, the emitter aperture 125 is formed by etching the insulation layer 120 exposed through the gate electrode 130. At this point, the cathode 110 is exposed through the emitter aperture 125.

Subsequently, CNTs 153, which are electron emitting sources, are formed on the cathode 110 inside of the emitter aperture 125. The CNTs 153 can be formed by growing the CNTs on the cathode 110 using Chemical Vapor Deposition (CVD). CVD includes thermal CVD and Plasma Enhanced CVD (PECVD). The CNTs 153 can be formed through a printing method using CNT paste. A CNT support 151 can be provided between the CNTs and the cathode 110.

Figure 5:
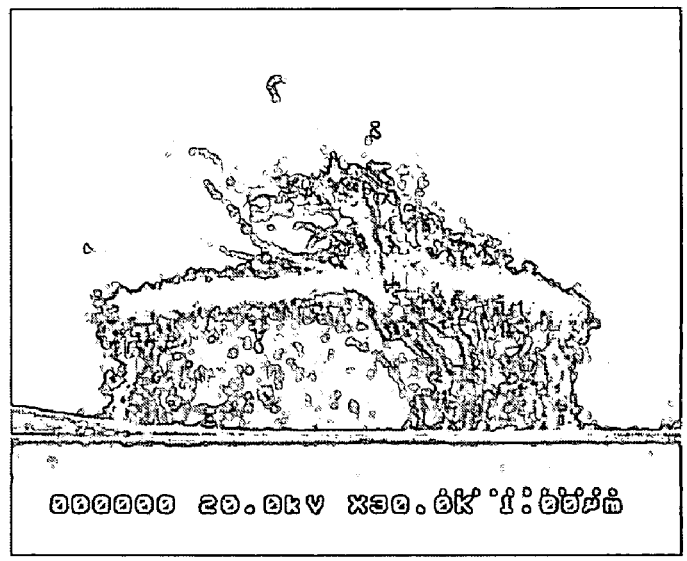
FIGS. 5 through 8 are photographs of a method of manufacturing an FED according to an embodiment of the present invention.

As described above, when the CNTs 153 are formed on the cathode 110 using a CVD or the printing method, the CNTs 153 are formed of different lengths. FIG. 5 is a photograph of CNTs 153 formed on the cathode 110 using a CVD or printing method. Referring to FIG. 5, it is revealed that the CNTs have non-uniform lengths.

Figure 2:
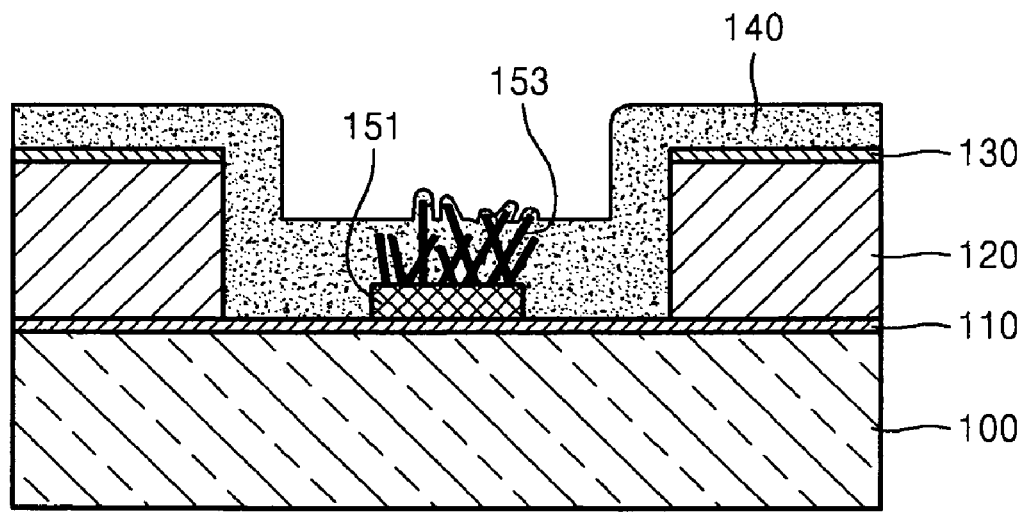
Figure 6:
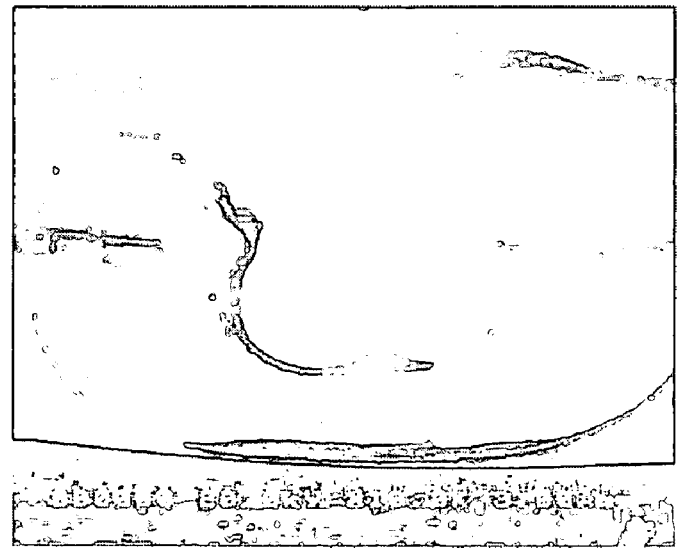

Referring to FIG. 2, an organic film 140 is coated on the entire surface of the structure of FIG. 1 to cover the CNTs 135 formed inside of the emitter aperture 125. The organic film 140 can have excellent adhesiveness with respect to the CNTs 153 and viscosity that allows the organic film 140 to be formed along the shapes of the CNTs 153. The organic film 140 can be formed of a material that can be easily removed during a subsequent process. The organic film 140 can be formed of a photoresist, for example. FIG. 6 is a photograph of the organic film 140 coated to cover the CNTs 153.

Figure 3:
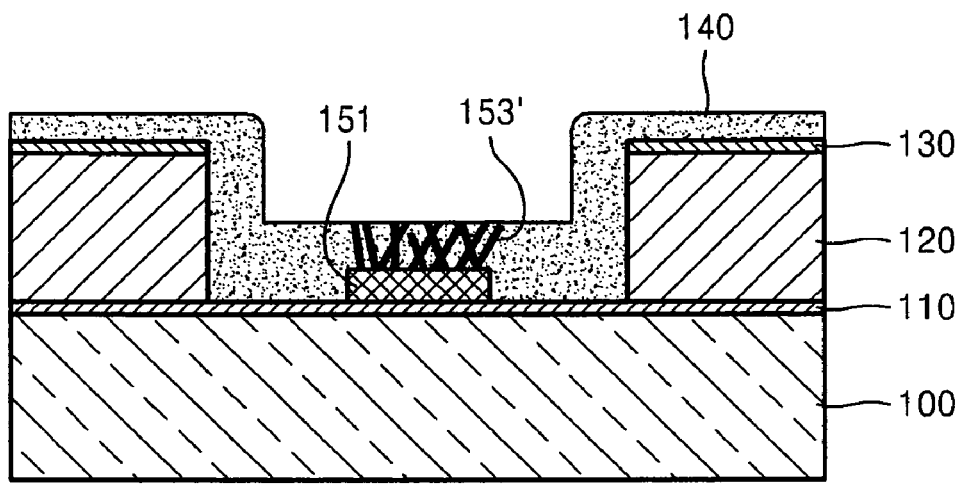
Figure 7:
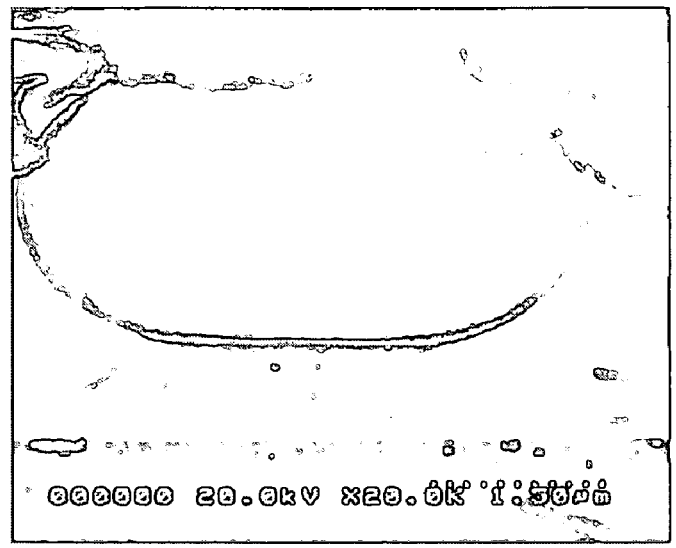

Referring to FIG. 3, the organic film 140 covering the CNTs 153 is etched to a predetermined depth. At this point, the projected portions of the CNTs 153 are removed together with the etched organic film 140. The organic film 140 can be etched using dry etching. The dry etching includes oxygen plasma etching. As described above, it is possible to obtain CNTs 153' having uniform lengths by etching and removing the organic film 140 covering the projected portions of the CNTs 153. FIG. 7 is a photograph of the organic film 140 covering the CNTs 153 being etched to a predetermined depth using oxygen plasma etching.

Figure 4:
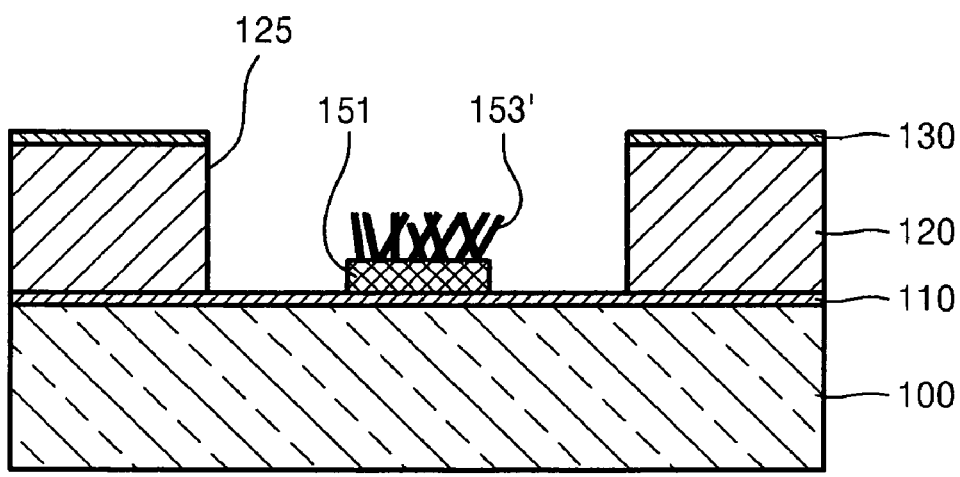
Figure 8:
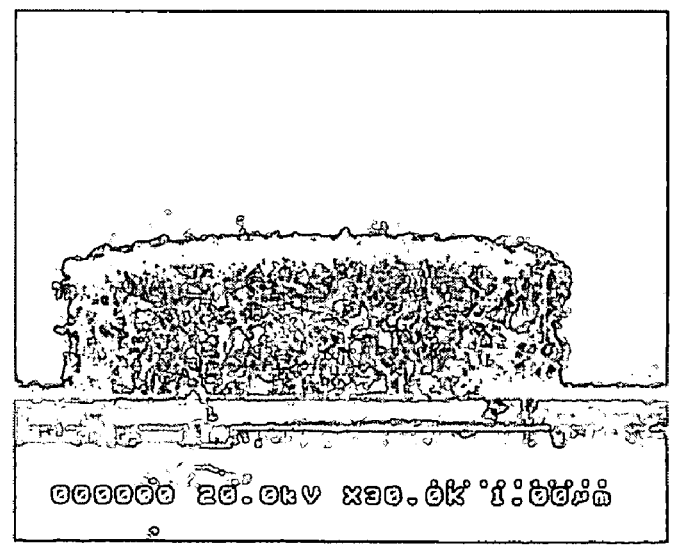

Lastly, referring to FIG. 4, when the organic film 140 covering the CNTs 153' is removed, a FED having CNTs 153' of uniform lengths is completed. The organic film 140 including the photoresist can be removed using a photoresist stripper. FIG. 8 is a photograph of the organic film 140 covering the CNTs 153' removed and the lengths of the CNTs 153' being uniform.

As described above, when the organic film 140 is coated on the cathode 110 to cover the CNTs 153 having non-uniform lengths and etched to a predetermined depth, CNTs 153' having uniform lengths are obtained.

Though the method of manufacturing FEDs having tri-electrode structures by making the lengths of the CNTs uniform using an organic film have been described above, the method of achieving uniform lengths of CNTs can also be applied to a method of manufacturing FEDs having bi-electrode structures and methods of manufacturing a variety of electronic devices.

As describe above, according to the present invention, it is possible to obtain CNTs 153' having uniform lengths by coating the organic film 140 to cover the CNTs 153 having non-uniform lengths and etching the organic film 140 to a predetermined depth. Also, in FEDs having the CNTs of uniform lengths, uniform brightness improves and the life of the FEDs increase.

While the present invention has been particularly shown and described with reference to exemplary embodiments thereof, it will be understood by those of ordinary skill in the art that various modifications in form and detail can be made therein without departing from the spirit and scope of the present invention as defined by the following claims.

What is claimed is:

1. A method of achieving uniform lengths of Carbon Nano-Tubes (CNTs), the method comprising:
    forming CNTs of varying lengths on a predetermined material layer;
    coating an organic film to cover the CNTs formed on the predetermined material layer;
    etching the organic film to a predetermined depth to remove projected portions of the CNTs; and
    removing the organic film to leave CNTs of uniform length.

2. The method of claim 1, wherein the organic film comprises a photoresist.

3. The method of claim 1, wherein the organic film is etched by dry etching.

4. The method of claim 3, wherein the dry etching comprises oxygen plasma etching.

5. A method of manufacturing a Field Emission Device (FED), the method comprising:
    sequentially forming a cathode, an insulation layer, and a gate electrode on a substrate, and forming an emitter aperture exposing the cathode in the insulation layer;
    forming Carbon NanoTubes (CNTs) of varying lengths on the cathode in the inside of the emitter aperture;
    coating an organic film to cover the CNTs;
    etching the organic film to a predetermined depth to remove projected portions of the CNTs; and
    removing the organic film to leave CNTs of uniform length.

6. The method of claim 5, wherein the CNTs are formed on the cathode using either a Chemical Vapor Deposition (CVD) or a printing method.

7. The method of claim 5, wherein the organic film comprises a photoresist.

8. The method of claim 5, wherein the organic film is etched by dry etching.

9. The method of claim 8, wherein the dry etching comprises oxygen plasma etching.

10. A method of achieving uniform lengths of Carbon NanoTubes (CNTs), the method comprising:
    forming CNTs on a predetermined material layer;
    coating an organic film to cover the CNTs formed on the predetermined material layer;
    oxygen plasma etching the organic film to a predetermined depth to remove projected portions of the CNTs; and
    removing the organic film.

11. A method of manufacturing a Field Emission Device (FED), the method comprising:
    sequentially forming a cathode, an insulation layer, and a gate electrode on a substrate, and forming an emitter aperture exposing the cathode in the insulation layer;
    forming Carbon NanoTubes (CNTs) on the cathode in the inside of the emitter aperture;
    coating an organic film to cover the CNTs;
    oxygen plasma etching the organic film to a predetermined depth to remove projected portions of the CNTs; and
    removing the organic film.

* * * * *